(12) United States Patent
Park et al.

(10) Patent No.: US 8,605,674 B2
(45) Date of Patent: Dec. 10, 2013

(54) METHOD AND APPARATUS FOR TRANSMITTING AND RECEIVING DUPLICATE DATA IN A MULTICARRIER WIRELESS COMMUNICATION SYSTEM

(75) Inventors: Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 13/320,018

(22) PCT Filed: Apr. 26, 2010

(86) PCT No.: PCT/KR2010/002607
§ 371 (c)(1),
(2), (4) Date: Nov. 10, 2011

(87) PCT Pub. No.: WO2010/131850
PCT Pub. Date: Nov. 18, 2010

(65) Prior Publication Data
US 2012/0057560 A1    Mar. 8, 2012

Related U.S. Application Data

(60) Provisional application No. 61/177,269, filed on May 11, 2009.

(30) Foreign Application Priority Data

Apr. 20, 2010    (KR) .................. 10-2010-0036430

(51) Int. Cl.
*H04W 4/00*    (2009.01)

(52) U.S. Cl.
USPC ............................................ 370/329; 370/431

(58) Field of Classification Search
USPC .................... 370/310, 328–330, 431
See application file for complete search history.

(56) References Cited

U.S. PATENT DOCUMENTS

| | | | |
|---|---|---|---|
| 2010/0098012 A1* | 4/2010 | Bala et al. ................. | 370/329 |
| 2010/0232382 A1* | 9/2010 | Gauvreau et al. ......... | 370/329 |
| 2011/0206000 A1* | 8/2011 | Kwon et al. .............. | 370/330 |

FOREIGN PATENT DOCUMENTS

| | | |
|---|---|---|
| KR | 1020040106544 | 12/2004 |
| KR | 1020050106435 | 11/2005 |
| KR | 1020070006748 | 1/2007 |
| KR | 1020090026724 | 3/2009 |

* cited by examiner

*Primary Examiner* — Kerri Rose
(74) *Attorney, Agent, or Firm* — Lee, Hong, Degerman, Kang & Waimey

(57) ABSTRACT

The present invention relates to a wireless communication system, and more particularly, discloses a method and an apparatus for transmitting and receiving duplicate data in a multicarrier wireless communication system. According to one embodiment of the present invention, a method in which a transmitter, which supports carrier aggregation for performing communication using N (N≥2) component carriers, transmits duplicate data, comprises the steps of: generating, in a media access control (MAC) layer of the transmitter, N duplicate data using radio link control (RLC) protocol data units (PDUs) from an RLC layer, and simultaneously transmitting, to a receiver, the respective N duplicate data on the N component carriers through respective N hybrid automatic repeat and request (HARQ) entities.

11 Claims, 13 Drawing Sheets

METHOD AND APPARATUS FOR TRANSMITTING AND RECEIVING DUPLICATE DATA IN A MULTICARRIER WIRELESS COMMUNICATION SYSTEM

CROSS-REFERENCE TO RELATED APPLICATIONS

This application is a 371 U.S. national stage application of International Application No. PCT/KR2010/002607, filed on Apr. 26, 2010, which claims priority to Korean Application Serial No. 10-2010-0036430, filed on Apr. 20, 2010, and U.S. Provisional Application Ser. No. 61/177,269, filed on May 11, 2009, the contents of which are incorporated by reference herein in their entirety.

TECHNICAL FIELD

The following description relates to a wireless communication system, and more particularly, to a method and apparatus for transmitting and receiving duplication data in a wireless communication system supporting multiple carriers.

BACKGROUND ART

In a general wireless communication system, only one carrier is considered even though different uplink (UL) and downlink (DL) bandwidths are configured. For example, a wireless communication system in which the number of carriers constituting each of UL and DL is 1 and a UL bandwidth and a DL bandwidth are generally symmetrical may be provided based on a single carrier.

In the International Telecommunication Union (ITU), an IMT-Advanced candidate technique demands support of an extended bandwidth compared with a conventional wireless communication system. However, it is not easy to allocate frequency of a wide bandwidth except in some areas of the world. Accordingly, as a technique for efficiently using a fragmented narrow band, a carrier aggregation (also called bandwidth aggregation or spectrum aggregation) technique generating an effect as if a wide band is logically used by physically grouping a plurality of bands in a frequency domain has been developed.

Carrier aggregation has been introduced to support increased throughput, prevent cost increase caused by introduction of a broadband RF element, and ensure compatibility with a conventional system. Carrier aggregation is a technique for allowing data exchange between a User Equipment (UE) and a Base Station (BS) through a plurality of carrier groups of a bandwidth unit defined in a conventional wireless communication system (an LTE system in the case of an LTE-A system, or an IEEE 802.16e system in the case of an IEEE 802.16m system). Here, a carrier of a bandwidth unit defined in a conventional wireless communication system may be referred to as a Component Carrier (CC). For example, a carrier aggregation technique may include a technique supporting a system bandwidth of up to a maximum of 100 MHz by grouping a maximum of 5 CCs even if one CC supports a bandwidth of 5 MHz, 10 MHz, or 20 MHz.

Meanwhile, as an error control method in UL/DL transmission, an Automatic Repeat and reQuest (ARQ) scheme using error detection information may be used. Moreover, as an improved ARQ scheme, a Hybrid ARQ (HARQ) scheme for performing decoding by combining originally transmitted information with retransmitted information in order to reduce the number of retransmission times caused by occurrence of errors may be used. The HARQ scheme is described in brief by taking UL as an example. A BS receiving UL data on a data channel (PDSCH) from a UE transmits an Acknowledgement/Negative Acknowledgement (ACK/NACK) signal for the UL data on a control channel (PHICH) after a predetermined time period. Although the BS receiving the UL data can transmit the control channel (PHICH) after 4 Transmission Time Intervals (TTIs), the predetermined time is not limited thereto. The ACK/NACK signal is determined as an ACK signal when the UL data is successfully decoded and as a NACK signal when decoding of the UL data fails. If the ACK/NACK signal is determined as a NACK signal, the UE retransmits retransmission data for the UL data to the BS. Retransmission may be performed until the ACK signal is received or up to the maximum number of retransmission times. If the ACK/NACK signal is determined as an ACK signal, the UE may transmit new UL data to the BS. A transmission time point of the ACM/NACK signal or resource allocation for the UL/DL data may be dynamically indicated through signaling by the BS or may be previously scheduled according to the transmission time point of the UL/DL data or resource allocation.

In an LTE system, a TTI of 1 ms is used to reduce a delay time of data transmission and a Round Trip Time (RTT) of HARQ action can be reduced to 8 ms. However, if a UE is located at a cell edge and runs short of power, since sufficient energy cannot be used for data transmission during a short TTI, the probability of successful data transmission may be lowered. Further, if data transmitted to a BS from a UE is important data such as a quality measurement result value of a neighbor cell necessary for performing handover, a problem such as call drop may occur due to failure of data transmission.

Accordingly, a method for increasing the probability of successful data transmission and reception in a cell edge and especially increasing the probability of important data transmission is needed.

DETAILED DESCRIPTION OF THE INVENTION

Technical Problems

An object of the present invention is to increase the probability of successful data transmission and reception in a system supporting a carrier aggregation technique using a plurality of CCs.

Means for Solving Problems

To achieve the object of the present invention in accordance with one embodiment, there is provided a method for transmitting duplication data in a transmitter which supports carrier aggregation performing communication using N (where n≥2) component carriers, the method comprising generating, at a Media Access Control (MAC) layer of the transmitter, N duplication data using Radio Link Control (RLC) Protocol Data Units (PDUs) from an RLC layer, and simultaneously transmitting on the N component carriers each of the N duplication data to a receiver through each of N Hybrid Automatic Repeat and reQuest (HARQ) entities.

Each of the N HARQ entities uses independent or different Redundancy Version (RV) values with respect to the N duplication data.

The generation of the N duplication data may include generating one MAC PDU by multiplexing the RLC PDUs, and duplicately generating MAC PDUs which are the same as the one MAC PDU to generate the N duplication data.

The RLC PDUs may include a RLC PDU which is marked as data to be duplicately transmitted, and the generation of the N duplication data may include generating each of N MAC PDUs including at least the marked RLC PDUs while multiplexing the RLC PDUs.

If an Acknowledgement (ACK) signal is received as HARQ feedback with respect to one of the N duplication data, the method may further include configuring that the other duplication data is not retransmitted.

The transmitter may be a user equipment and the receiver may be a base station, and the method may further include receiving control information about duplication data transmission from the base station through one or more of the N component carriers.

The control information may include uplink grant for duplication data transmission and the uplink grant may be masked with a user equipment identifier or with an identifier for duplication data transmission.

To achieve the object of the present invention in accordance with another embodiment, there is provided a method for receiving duplication data in a receiver which supports carrier aggregation performing communication using N (where n≥2) component carriers, the method comprising receiving N duplication data on the N carrier components from a transmitter through each of N Hybrid Automatic Repeat and reQuest (HARQ) entities, combining the N duplication data and decoding the combined N duplication data, and transmitting HARQ feedback based on the decoded result through one or more of the N HARQ entities.

The transmitter may be a base station and the receiver may be a user equipment, and the method may further include receiving control information about duplication data reception from the base station through one or more of the N component carriers.

The control information may include downlink assignment for duplication data reception and the downlink assignment may be masked with a user equipment identifier or with an identifier for duplication data transmission.

To achieve the object of the present invention in accordance with still another embodiment, there is provided a user equipment device which supports carrier aggregation performing communication using N (where n≥2) component carriers and transmits duplication data, comprising a Radio Link Control (RLC) layer module for generating transmission data as RLC Protocol Data Units (PDUs) and transmitting the RLC PDUs to a Media Access Control (MAC) layer, a MAC layer module including a multiplexing entity for generating a MAC PDU by multiplexing the RLC PDUs transmitted by the RLC layer module, a duplication entity for receiving the MAC PDU generated from the multiplexing entity and delicately generating N same MAC PDUs, and N Hybrid Automatic Repeat and reQuest (HARQ) entities corresponding to the N component carriers, and a physical layer module for mapping transport channels received from the N HARQ entities to uplink physical channels, transmitting the mapped channels to a base station, and receiving downlink control channels from the base station, wherein, if control information about duplication data transmission is received from the base station, the MAC layer module generates N duplication data using the RLC PDUs through the multiplexing entity and the duplication entity and transfers the N duplication data to the physical layer module through the N HARQ entities, and the physical layer module maps the transport channels received from the N HARQ entity to uplink physical channels and simultaneously transmits the mapped channels to the base station.

To achieve the object of the present invention in accordance with a further embodiment, there is provided a user equipment device which supports carrier aggregation performing communication using N (where n≥2) component carriers and receives duplication data, comprising a Media Access Control (MAC) layer module including N Hybrid Automatic Repeat and reQuest (HARQ) entities corresponding to the N component carriers, a duplication entity for combining and decoding MAC Protocol Data Units (PDUs) transferred from the N HARQ entities, and a demultiplexing entity for demultiplexing the MAC PDUs transferred from the duplication entity, and a physical layer module for transmitting downlink physical channels received on the N component carriers to the N HARQ entities through transport channels and receiving downlink control channels from a base station, wherein, if control information about duplication data reception is received from the base station, the MAC layer module transfers N duplication data on the N component carriers to the duplication entity through the N HARQ entities, combines and decodes the N duplication data through the duplication entity, and transmits HARQ feedback based on the decoded result to the base station through one or more of the N HARQ entities.

Advantageous Effects

According to the present invention, the probability of successful data transmission and reception can be increased in a system supporting a carrier aggregation technique using a plurality of CCs. Moreover, the probability of successful transmission and reception of important data can be selectively increased.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

Figure 1:
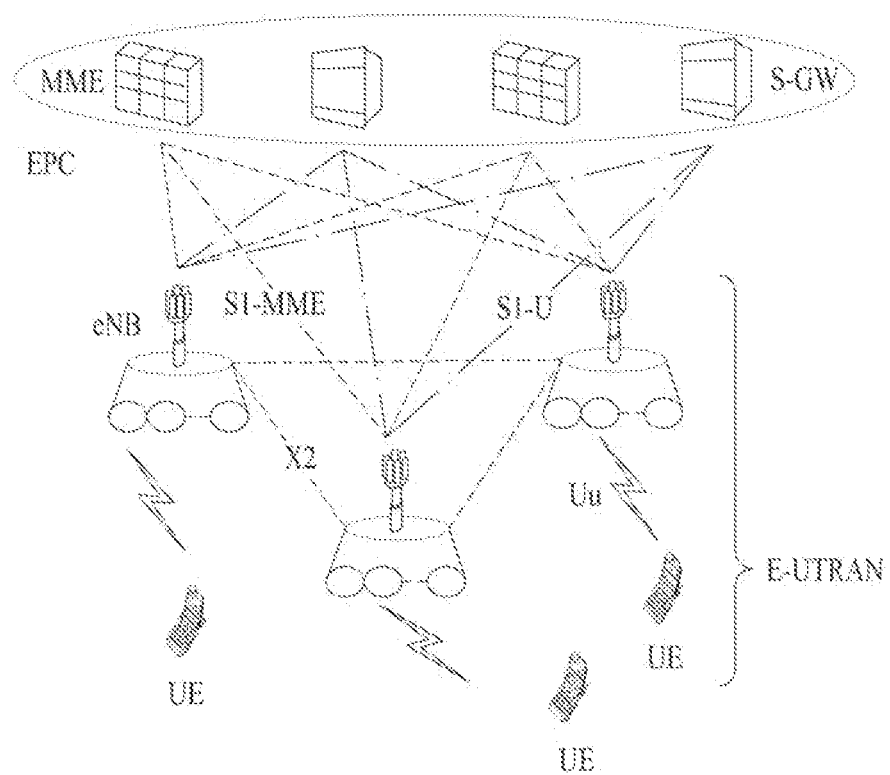
FIG. 1 is a diagram illustrating the architecture of a wireless communication system.

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a terminal. Here, the base station refers to a terminal node of a network communicating directly with the terminal. In some cases, a specific operation described as being performed by the base station may be performed by an upper node of the base station.

Namely, it is apparent that, in a network comprised of a plurality of network nodes including a base station, various operations performed for communication with a mobile station may be performed by the base station, or network nodes other than the base station. The term 'Base Station' (BS) may be replaced with the terms fixed station, Node B, eNode B (eNB), access point, etc. The term 'relay' may be replaced with the terms Relay Node (RN), Relay Station (RS), etc. The term 'terminal' may be replaced with the terms User Equipment (UE), Mobile Station (MS), Mobile Subscriber Station (MSS), Subscriber Station (SS), etc.

The specific terms used in the following description are provided to aid in understanding of the present invention and those terms may be changed without departing from the spirit of the present invention.

In some instances, known structures and devices are omitted or are shown in block diagram form, focusing on important features of the structures and devices, so as not to obscure the concept of the present invention. The same reference numbers will be used throughout this specification to refer to the same or like parts.

The embodiments of the present invention can be supported by standard documents disclosed in at least one of wireless access systems, i.e., IEEE 802, 3GPP, 3GPP LTE, LTE-Advanced (LTE-A), and 3GPP2. Namely, among the embodiments of the present invention, steps or parts which are not described to clarify the technical features of the present invention can be supported by the above standard documents. Also, all terms disclosed herein can be described by the above standard documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied as radio technology such as Universal Terrestrial Radio Access (UTRA) or CDMA2000. TDMA may be embodied as radio technology such as Global System for Mobile communications (GSM)/General Packet Radio Service (GPRS)/Enhanced Data Rates for GSM Evolution (EDGE). OFDMA may be embodied with radio technology such as IEEE 802.11 (Wi-Fi), IEEE 802.16 (WiMAX), IEEE 802-20, and Evolved UTRA (E-UTRA). UTRA is a part of the Universal Mobile Telecommunications System (UMTS). The 3rd Generation Partnership Project (3GPP) Long Term Evolution (LTE) is a part of the Evolved UMTS (E-UMTS), which uses E-UTRA. 3GPP LTE employs OFDMA in DL and employs SC-FDMA in UL. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A systems. However, technical features of the present invention are not limited thereto.

Architecture of LTE System

The architecture of an LTE system, which is an example of a wireless communication system to which the present invention is applicable, is described with reference to FIG. 1. The LTE system is a mobile communication system that has evolved from a UMTS system. As illustrated in FIG. 1, the LTE system architecture can be roughly classified into an Evolved UMTS Terrestrial Radio Access Network (E-UTRAN) and an Evolved Packet Core (EPC). The E-UTRAN may include a User Equipment (UE) and an Evolved NodeB (eNB, base station), wherein the connection between UE and the eNB is called a Uu interface, and the connection between eNBs is called an X2 interface. The EPC includes a Mobility Management Entity (MME) performing a control plane function and a Serving Gateway (S-GW) performing a user plane function, wherein the connection between the eNB and the MME is called an S1-MME interface, and the connection between the eNB and the S-GW is called an S1-U interface, and both connections may be commonly called an S1 interface.

Figure 2:
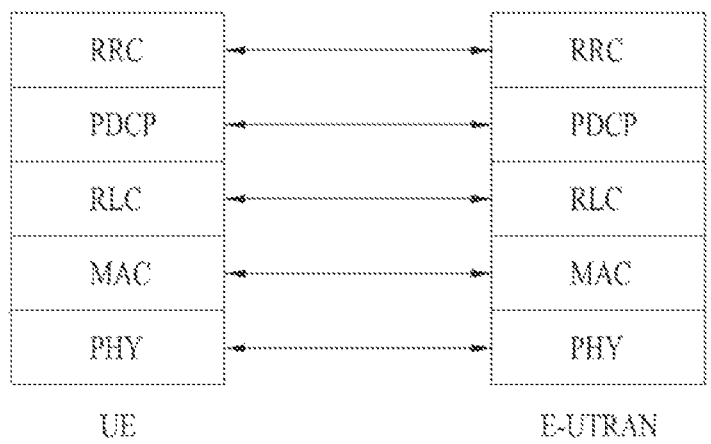
FIG. 2 is a diagram illustrating a control plane of a radio protocol.
Figure 3:
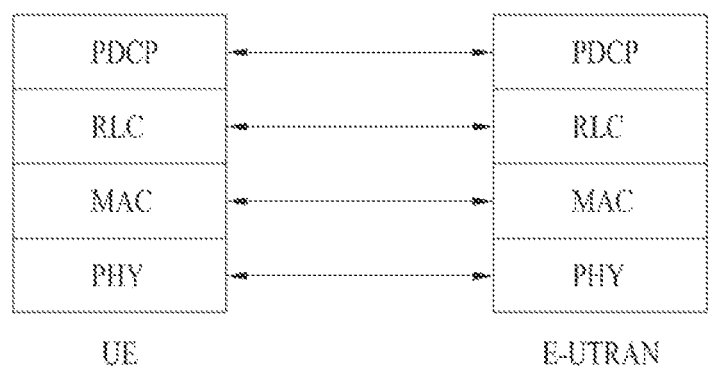
FIG. 3 is a diagram illustrating a user plane of a radio protocol.

A radio interface protocol is defined in the Uu interface which is a radio section, wherein the radio interface protocol is horizontally comprised of a physical layer, a data link layer, a network layer, and vertically classified into a user plane for user data transmission and a control plane for signaling (control signal) transfer. Such a radio interface protocol can be typically classified into L1 (first layer) including a PHY layer which is a physical layer, L2 (second layer) including MAC/RLC/PDCP layers, and L3 (third layer) including an RRC layer as illustrated in FIGS. 2 and 3, based on the three lower layers of an Open System Interconnection (OSI) reference model widely known in the field of communication systems. Those layers exist as a pair in the UE and E-UTRAN, thereby performing data transmission of the Uu interface.

Each layer of a radio protocol shown in FIGS. 2 and 3 is described. FIGS. 2 and 3 are views illustrating the control plane and user plane architecture of the radio protocol, respectively.

The physical layer (PHY) which is a first layer provides information transfer services to the upper layers using a physical channel. The PHY layer is connected to the upper MAC layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at transmitter and receiver sides.

Various layers exist in the second layer. First, the MAC layer serves to map various logical channels to various transport channels, and also performs logical channel multiplexing for mapping several logical channels to one transport channel. The MAC layer is connected to an upper RLC layer through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A Packet Data Convergence Protocol (PDCP) layer of the second layer performs a header compression function for reducing the size of an IP packet header, which is relatively large in size and contains unnecessary control information to efficiently transmit IP packets, such as IPv4 or IPv6 packets, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels, and physical channels in relation to configuration, re-configuration, and release of RBs. Here, the RB denotes a logical path provided by the first and the second layers for transferring data between the UE and the UTRAN. In general, the configuration of the RB refers to a process of stipulating the characteristics of protocol layers and channels required for providing a specific service, and setting each of the detailed parameter and operation methods thereof. The RB is divided into a Signaling RB (SRB) and a Data RB (DRB), wherein the SRB is used as a path for transmitting RRC messages in the control plane while the DRB is used as a path for transmitting user data in the user plane.

Carrier Aggregation Technology

Figure 4:
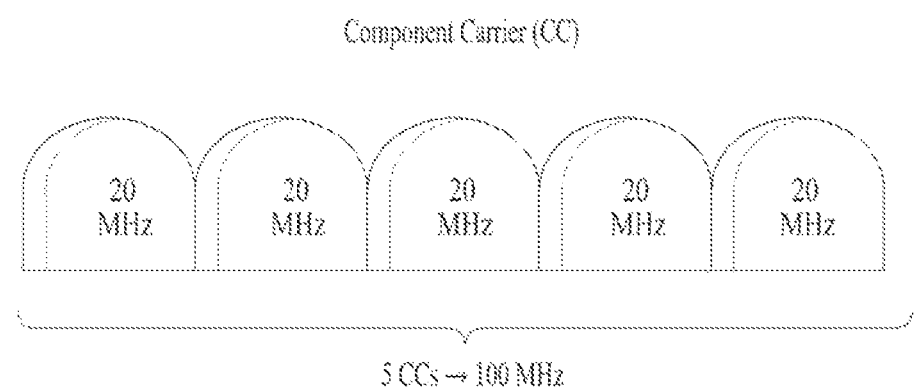
FIG. 4 is a diagram illustrating carrier aggregation.

Carrier aggregation technology supporting multiple carriers is described with reference to FIG. 4.

As described previously, carrier aggregation can support a system bandwidth up to a maximum of 100 MHz by grouping a maximum of 5 carriers (CCs) of a bandwidth unit (e.g. 20 MHz) defined in a conventional wireless communication system (e.g., an LTE system).

The bandwidth sizes of CCs used for carrier aggregation may be the same or different. Individual CCs have different frequency bands (or central frequencies). Individual CCs used for carrier aggregation may be present on contiguous frequency bands or discontinuous frequency bands. In the carrier aggregation technology, bandwidth sizes of UL and DL may be symmetrically or asymmetrically allocated.

A plurality of carriers (CCs) used for carrier aggregation can be classified into Primary Component Carriers (PCCs) and Secondary Component Carriers (SCCs). The PCCs refer to carriers used for exchanging traffic and control signaling between a BS and a UE. Control signaling may include addition of CCs, configuration of PCCs, configuration of Discontinuous Reception (DRX), UL or DL assignment, etc. Although a BS may use a plurality of CCs, a UE belonging to the BS may be assigned only one PCC. If the UE operates in single carrier mode, a PCC is used. Accordingly, the PCCs should be configured to satisfy all requirements necessary for exchange of data and control signaling between a BS and a UE so as to be independently used.

Meanwhile, the SCCs refer to additional CCs which can be activated or deactivated according to the required amount of transmission and reception data. The SCCs may be configured to be used only according to a specific command or rule received from a BS. Also, the SCCs may be configured to be used together with the PCCs in order to support an additional bandwidth. Through activated SCCs, a control signal such as UL grant or DL assignment is transmitted from a BS to a UE, or a control signal through UL, such as a Channel Quality Indicator (CQI), a Precoding Matrix Index (PMI), a Rank Indicator (RI), or a Sounding Reference Signal (SRS) may be transmitted from the UE to the BS.

Resource assignment for a UE may have a range of a PCC and a plurality of SCCs. In carrier aggregation mode, a system may asymmetrically allocate SCCs on DL and/or UL to a UE based on system load (i.e. static/dynamic load balancing), peak data rate, or QoS demand.

In using the carrier aggregation technology, configuration for CCs is provided to a UE from a BS after an RRC connection procedure. RRC connection means that radio resources are allocated to the UE based on RRC signaling exchanged between an RRC layer of the UE and a network through an SRB. After the RRC connection procedure of the UE and the BS, the UE may receive configuration information for PCCs and SCCs from the BS. Configuration for the SCCs may include addition/deletion (or enabling/disabling) of the SCCs. Accordingly, in order to activate SCCs between the BS and the UE or deactivate existing SCCs, it is necessary to exchange RRC signaling and a MAC control element.

Enabling or disabling of SCCs may be determined by the BS based on QoS, load condition of carriers, and other factors. The BS may direct the UE to configure SCCs using a control message including information such as an indication type (activation/deactivation) for DL/UL and SCC lists.

Architecture of UL/DL L2 Considering Carrier Aggregation Technology

Figure 5:
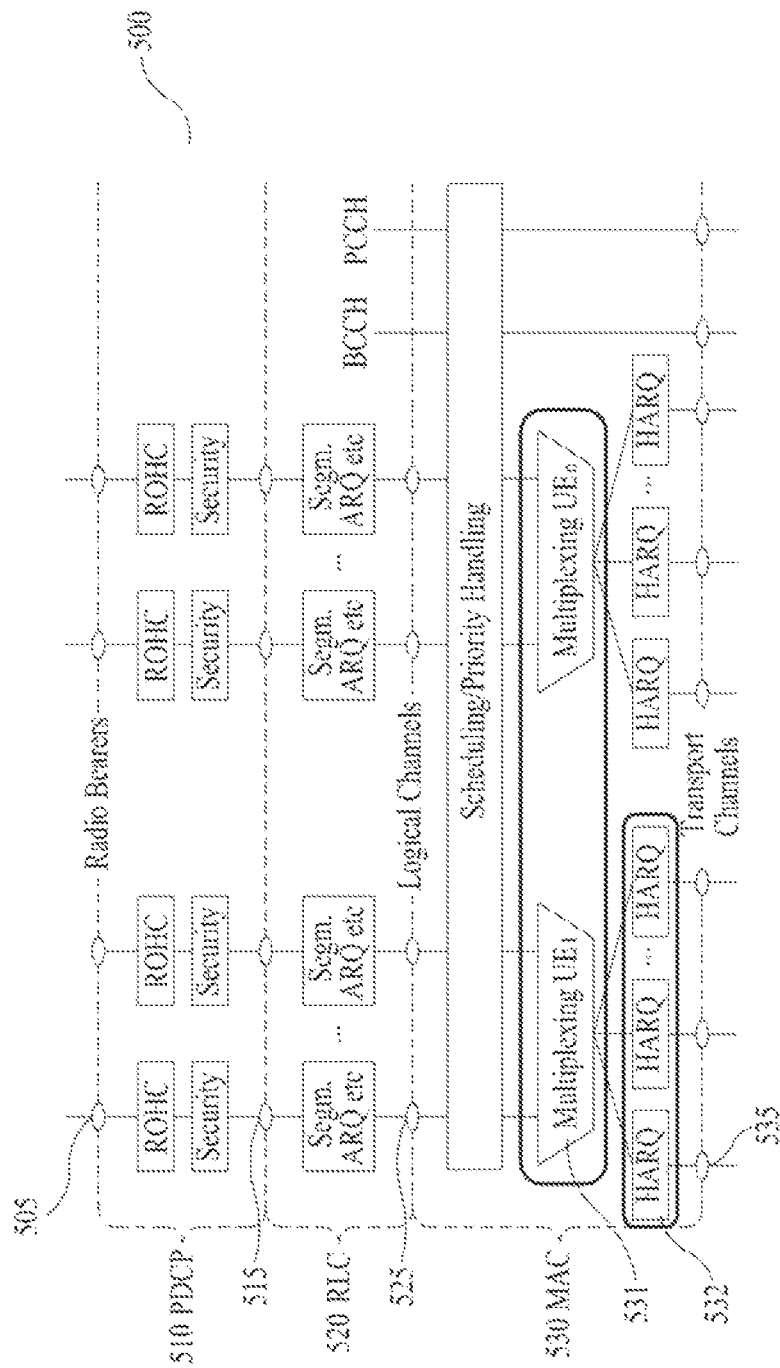
FIG. 5 is a diagram illustrating the architecture of a DL L2 (second layer) in carrier aggregation.
Figure 6:
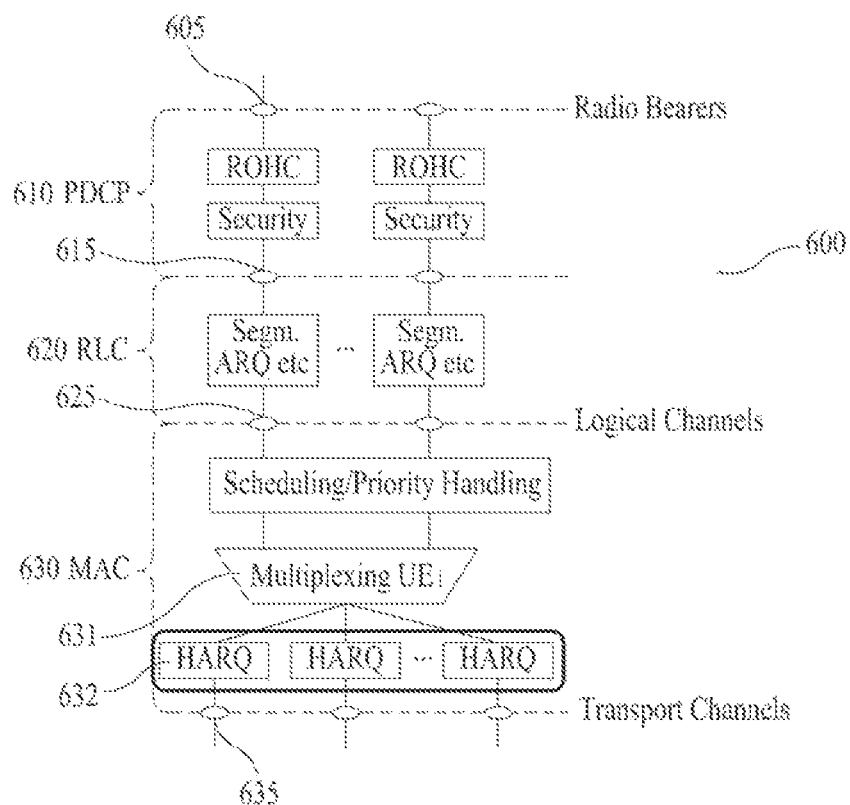
FIG. 6 is a diagram illustrating the architecture of a UL L2 (second layer) in carrier aggregation.

The architecture of an L2 (second layer) considering the carrier aggregation technology is described with reference to FIGS. 5 and 6. FIG. 5 is a diagram illustrating the architecture of a DL L2 (second layer) in carrier aggregation, and FIG. 6 is a diagram illustrating the architecture of a UL L2 (second layer) in carrier aggregation.

In a DL L2 architecture 500 of FIG. 5, a PDCP layer 510, an RLC layer 520, and a MAC layer 530 are shown. In FIG. 5, elements 505, 515, 525, and 535 denoted by circles on interfaces between layers indicate Service Access Points (SAPs) for peer-to-peer communication. The SAP 535 between a PHY channel (not shown) and the MAC layer provides a transport channel and the SAP 525 between the MAC layer and the RLC layer provides a logical channel. General operation of each layer has been described above.

In the MAC layer, a plurality of logical channels (i.e. RBs) is multiplexed from the RLC layer. In the DL L2 architecture, a plurality of multiplexing entities 531 of the MAC layer is associated with application of Multiple Input Multiple Output (MIMO) technology. In a system which does not consider carrier aggregation technology, since one transport channel is generated by multiplexing a plurality of logical channels in the case of non-MIMO, one HARQ entity (not shown) is provided to one multiplexing entity.

Meanwhile, in a system considering carrier aggregation technology, a plurality of transport channels corresponding to a plurality of CCs is generated from one multiplexing entity 531. In relation to this, in carrier aggregation technology, one HARQ entity 532 manages one CC. Accordingly, the MAC layer 530 of a system supporting carrier aggregation technology provides a plurality of HARQ entities 532 to one multiplexing entity 531 and performs operations related to the entities. Moreover, since each HARQ entity 532 independently processes a transport block, a plurality of transport blocks can be simultaneously transmitted and received through a plurality of CCs.

A UL L2 architecture 600 of FIG. 6 performs the same operation as the DL L2 architecture 500, except that one multiplexing entity 631 is included in one MAC layer 630. In more detail, a plurality of HARQ entities 632 is provided for a plurality of CCs and the MAC layer 630 performs operations related to the plurality of HARQ entities 632. A plurality of transport blocks can be simultaneously transmitted and received through a plurality of CCs.

Hybrid Automatic Repeat and Request (HARQ)

Figure 7:
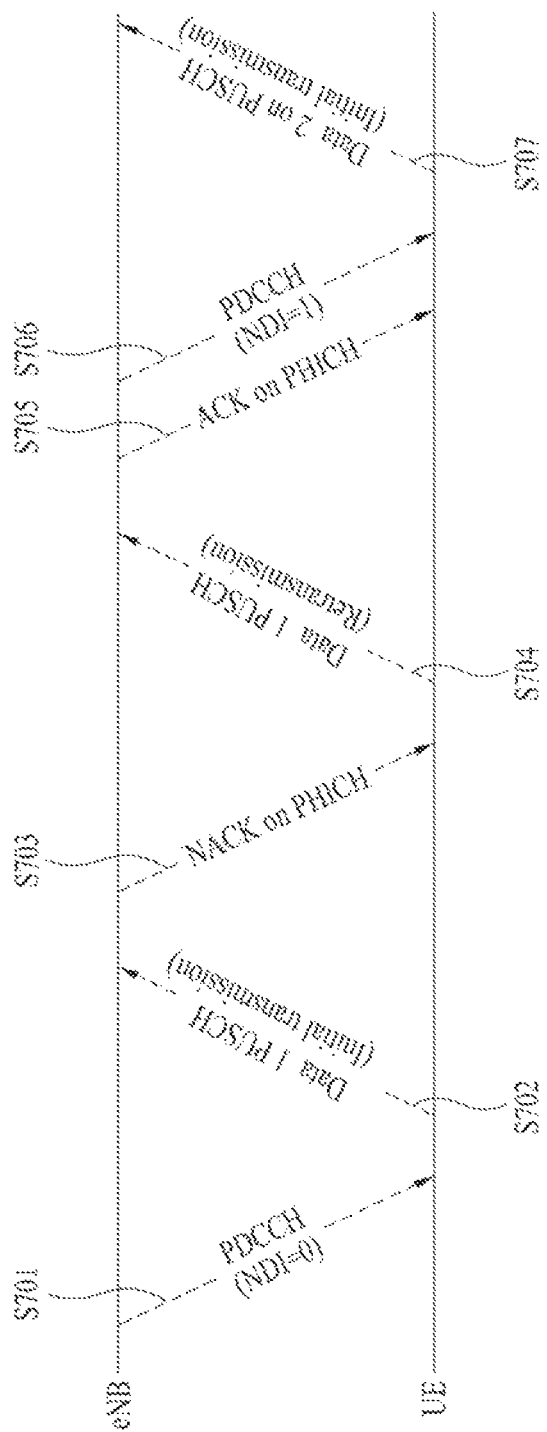
FIG. 7 is a diagram illustrating a UL HARQ action scheme.

A UL HARQ action scheme is described with reference to FIG. 7.

An eNB may transmit UL grant information or UL scheduling information to a UE through a Physical Downlink Control Channel (PDCCH) so that the UE can transmit data to the eNB in accordance with a HARQ scheme (step S701). Generally, the UL scheduling information may include UE identifier (ID) (C-RNTI or Semi-Persistent Scheduling C-RNTI), resource block assignment to be allocated to a UE indicated by the UE ID, transmission parameters (modulation, coding scheme, and redundancy version), and a New Data Indicator (NDI).

In relation to this, a MAC layer of the UE includes HARQ entities for managing a HARQ operation and a HARQ entity manages multiple (e.g. 8) HARQ processes.

The plurality of HARQ processes are operated synchronously with time. Namely, respective HARQ processes are synchronously allocated every TTI. HARQ process 1 is used in TTI 1, HARQ process 2 in TTI 2, . . . , HARQ process 8 in TTI 8, HARQ process 1 is again used in TTI 9 and HARQ process 2 is again used in TTI 10. In this way, specific HARQ processes can be sequentially assigned in accordance with each data reception time point. Furthermore, each of the plurality of HARQ processes has an independent HARQ buffer.

Since the HARQ processes are assigned synchronously according to time as described above, upon receiving a PDCCH for initial transmission of specific data, the HARQ process manages the HARQ process so that the HARQ process connected with the received time point (TTI) can transmit the data. For example, if the UE receives the PDCCH including UL scheduling information in the Nth TTI, the UE transmits data in the (N+4)th TTI. In other words, HARQ process K assigned in the (N+4)th TTI is used for data transmission. The UE may monitor the PDCCH through which UL scheduling information is transmitted every TTI to identify the UL scheduling information transmitted thereto, and then may transmit data to the eNB through a PUSCH in accordance with the UL scheduling information (step S702).

The UE generates data according to the UL scheduling information in a MAC Protocol Data Unit (PDU) format, stores the data in a HARQ buffer, and transmits the MAC PDU to the eNB at a transmission time point. Thereafter, the UE waits for HARQ feedback for transmission of the MAC PDU from the eNB.

If the data is received from the UE, the eNB stores the data in a soft buffer and then tries to decode the data. If decoding of the data is successfully performed, the eNB transmits an ACK signal to the UE. If the eNB fails to decode the data, the eNB transmits a NACK signal to the UE. In FIG. 7, as the eNB fails to decode the data, the eNB transmits the NACK signal to the UE through a Physical HARQ Indicator Channel (PHICH) (step S703).

If the HARQ NACK signal for the MAC PDU is received from the eNB, the UE may retransmit the same MAC PDU stored in the HARQ buffer at a designated time point in the same format or a new format (step S704). That is, the UE receives HARQ NACK in an Nth TTI, the UE retransmits a MAC PDU stored in a HARQ buffer of a corresponding HARQ process. On the other hand, if the ACK signal is received from the eNB, the UE senses that data transmission to the eNB has been successful, transmits next data, and stops HARQ retransmission for the data.

HARQ retransmission of the UE can be operated in accordance with a non-adaptive mode. Namely, initial transmission of specific data can be performed only if the PDCCH including the UL scheduling information should be received, but retransmission can be performed even if the PDCCH is not received. According to the HARQ retransmission of the non-adaptive mode, data retransmission is performed using the same UL scheduling information as that of the initial transmission in the TTI where next HARQ process is assigned, even though the PDCCH is not received.

Meanwhile, HARQ retransmission of the UE can be operated in accordance with an adaptive mode. In this case, transmission parameters of retransmission are received through the PDCCH. Scheduling information included in the PDCCH maybe different from that of initial transmission depending on channel status. For example, if the channel status is better than that of initial transmission, the UE may command data transmission at a high bit rate. On the other hand, if the channel status is not better than that of initial transmission, the UE may command data transmission at a low bit rate.

If the UE receives UL scheduling information, the UE can identify whether data to be transmitted corresponds to initial transmission or retransmission of previous data, through an NDI field included in a PDCCH. The NDI field is a one-bit field and is toggled in the order of 0→1→0→1→0 . . . whenever new data is transmitted. In case of retransmission, the NDI field has the same value as that of initial transmission. Accordingly, the UE compares the NDI field with a previously transmitted value to identify whether data retransmission is performed.

The UE increases the number of transmission times (CURRENT_TX_NB) by one whenever transmitting data in accordance with the HARQ scheme. If the CURRENT_TX_NB reaches the maximum number of transmission times established in an upper layer, the UE deletes a MAC PDU stored in a HARQ buffer.

Meanwhile, if retransmitted data is received, the eNB combines the retransmitted data with the data stored in the soft buffer in a state that decoding thereof fails, in accordance with various manners, and then attempts decoding again. If decoding is successfully performed, the eNB transmits an ACK signal to the UE. If decoding fails, the eNB transmits a NACK signal to the UE. The eNB repeats the procedure of transmitting the NACK signal and receiving the retransmitted signal until decoding of the data is successfully performed. In the example of FIG. 7, the eNB attempts decoding by combining the data retransmitted in step S704 with the previously received data. If decoding of the received data is successfully performed, the eNB transmits the ACK signal to the UE through the PHICH (step S705). Also, the eNB can transmit UL scheduling information for next data transmission to the UE through the PDCCH, and can toggle the NDI to 1 to indicate that the UL scheduling information is used not for adaptive retransmission but for new data transmission (step S706). Then, the UE can transmit new data to the eNB through the PUSCH corresponding to the received UL scheduling information (step S707).

Figure 8:
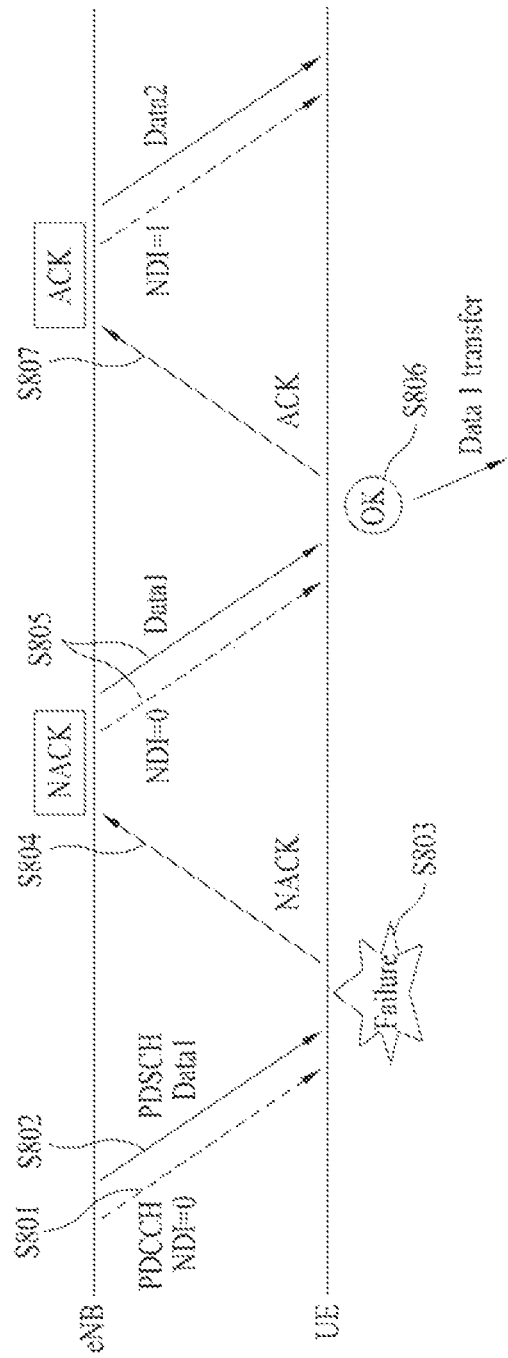
FIG. 8 is a diagram illustrating a DL HARQ action scheme.

A DL HARQ action scheme is described with reference to FIG. 8.

In order to transmit data to the UE in accordance with the HARQ scheme, the eNB transmits DL scheduling information to the UE through the PDCCH (step S801). The DL scheduling information may include UE ID), UE group ID, resource assignment, duration of assignment, transmission parameters (e.g. modulation mode, payload size, MIMO related information, HARQ process information, and Redundancy Version (RV)), and an NDI.

The DL scheduling information is retransmitted through the PDCCH even during retransmission, and may be varied depending on channel status. For example, if the channel status is better than that of initial transmission, the eNB may transmit data at a high bit rate by changing modulation or payload size. On the other hand, if the channel status is not better than that of initial transmission, the eNB may transmit data at a bit rate lower than that of initial transmission.

After identifying the DL scheduling information transmitted to the UE by monitoring the PDCCH every TTI, if there is information of the UE in the DL scheduling information, the UE receives data from the eNB through the PDSCH at the time associated with the PDCCH (step S802).

If the data is received from the eNB, the UE stores the data in a soft buffer and then attempts decoding of the data (step S803). The UE transmits HARQ feedback information to the eNB in accordance with the decoded result. Namely, if decoding of the data is successfully performed, the UE transmits an ACK signal to the eNB. If decoding of the data fails, the UE transmits a NACK signal to the eNB (step S804).

If the ACK signal is received from the UE, the eNB senses that data transmission to the UE has been successfully performed and transmits next data. Meanwhile, if the NACK signal is received from the UE, the eNB senses that data transmission to the UE has failed, and retransmits the same data in the same format or a new format at a proper time point (step S805).

The UE which has received the NACK signal attempts to receive retransmitted data. The UE can identify whether data to be transmitted corresponds to initial transmission or retransmission of previous data, through an NDI field included in the PDCCH. The NDI field is a one-bit field and is toggled in the order of 0→1→0→1→0 . . . whenever new data is transmitted. In case of retransmission, the NDI field has the same value as that of initial transmission. Accordingly, the UE compares the NDI field with a previously transmitted value to identify whether data retransmission is performed.

If the retransmitted data is received, the UE combines the retransmitted data with the data stored in the soft buffer in a state that decoding thereof fails, in accordance with various manners, and then attempts decoding again (step S806). If decoding is successfully performed, the UE transmits an ACK signal to the eNB. If decoding fails, the UE transmits a NACK signal to the eNB (step S807). The UE may repeat the procedure of transmitting the NACK signal and receiving the retransmitted signal until decoding of the data is successfully performed.

Method Using Duplication Data in Carrier Aggregation

As described above, if a UE is located at a cell edge and runs short of power, since sufficient energy cannot be used for data transmission during a short TTI such as 1 ms, the probability of successful data transmission may be lowered. The present invention proposes a method for increasing the probability of successful data transmission by duplicately generating the same data at a transmitter and by transmitting the duplicately generated data to a receiver through a plurality of CCs in a system which supports carrier aggregation using a plurality of CCs. Hereinafter, various embodiments of the present invention will be described.

Embodiment 1

The first embodiment of the present invention is described with reference to FIG. 9.

Figure 9:
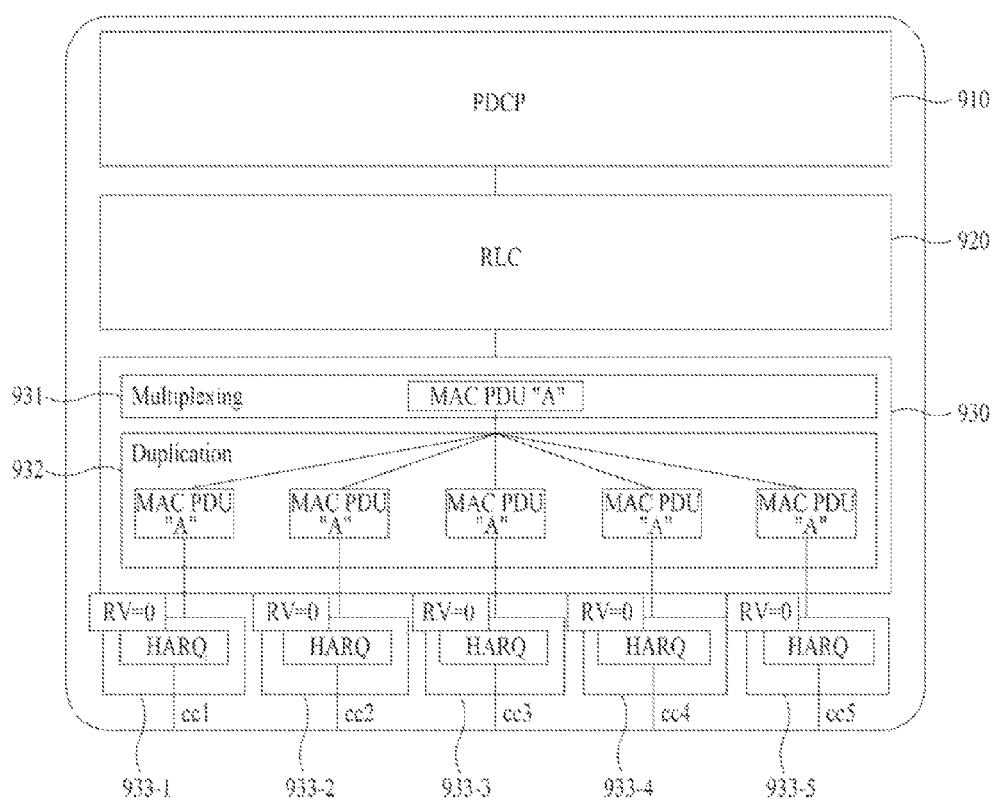
FIG. 9 is a diagram illustrating the architecture of an L2 (second layer) of a transmitter according to an embodiment of the present invention.

FIG. 9 illustrates a UL L2 architecture including a PDCP layer 910, an RLC layer 920, and a MAC layer 930. In this embodiment, a duplication entity 932 is defined in the MAC layer 930 of a transmitter. The duplication entity 932 may generate a plurality of duplicated MAC PDUs from one MAC PDU transmitted by a multiplexing entity 931 of the MAC layer 930 and transmit the duplicately generated MAC PDUs to HARQ entities 933-1, 933-2, . . . , 933-N corresponding to N CCs (FIG. 9 shows an example of N=5). The HARQ entities 933-1, 933-2, . . . , 933-N may simultaneously transmit the MAC PDUs to a receiver using independent RV values.

Specifically, a UE may receive a UL grant for duplication transmission from an eNB. The UE may receive the UL grant for duplication transmission through a specific DL CC (or specific cell) designated by the eNB or through all DL CCs (or all cells). When the UL grant for duplication transmission is transmitted through a specific CC (or specific cell), if the UE receives one UL grant for duplication transmission, the duplicately generated MAC PDUs are transmitted through all UL CCs (or all cells).

The UL grant may be transmitted through a control channel masked to a C-RNTI of the UE. The control channel may be a PDCCH in an LTE or LTE-A system and may be a High Speed Shared Control Channel (HS-SCCH), an Enhanced Dedicated Channel (E-DCH) Absolute Grant Channel (E-AGCH), or an E-DCH Relative Grant Channel (E-RGCH) in a High Speed Downlink Packet Access (HSDPA)/High Speed Uplink Packet Access (HSUPA) system supporting a dual cell. Alternatively, the eNB may allocate an RNTI (e.g. Duplication RNTI (D-RNTI)) which is newly defined to indicate the UL grant for duplication transmission to the UE. If the UL grant is received through the D-RNTI, the UE may perform duplication transmission.

If the UE receives the UL grant demanding duplication transmission, the multiplexing entity 931 of the MAC layer 930 of the UE generates a MAC PDU 'A' including RLC PDUs and MAC Control Elements (MAC CEs) according to the UL grant and transmits the MAC PDU 'A' to the duplication entity 932.

The duplication entity 932 receives the MAC PDU 'A' and duplicately generates the MAC PDUs 'A's by the number, N, of UL CCs constituting carrier aggregation. The duplication entity 932 transmits the duplicately generated MAC PDUs 'A's to the N HARQ entities 933-1, 933-2, . . . , 933-N corresponding to the respective CCs. The respective HARQ entities 933-1, 933-2, . . . , 933-N independently configure RV values for corresponding MAC PDUs and simultaneously transmit the MAC PDUs to the eNB. To simultaneously transmit data on CCs, a Frequency Division Multiplexing (FDM) scheme may be used.

Thus, even though transmission power is low for reasons such as a transmitter being located at a cell edge, since duplication data is transmitted on a plurality of CCs and a receiver combines the duplicately generated data, the probability of successful data transmission and reception can be increased. Furthermore, cell coverage can be increased compared with the case in which duplication data on a plurality of CCs is not used.

Meanwhile, if HARQ feedback for one MAC PDU among the MAC PDUs which are being duplicately transmitted by the UE is received as an ACK signal, the UE may stop transmitting the MAC PDUs. For example, if three HARQ entities transmit duplicated MAC PDUs and only one HARQ entity receives a HARQ ACK signal for the MAC PDU, the UE may not perform data retransmission through the HARQ entities receiving HARQ NACK signals even though the other two HARQ entities receive the HARQ NACK signals.

Embodiment 2

The second embodiment of the present invention is described with reference to FIG. 10.

Figure 10:
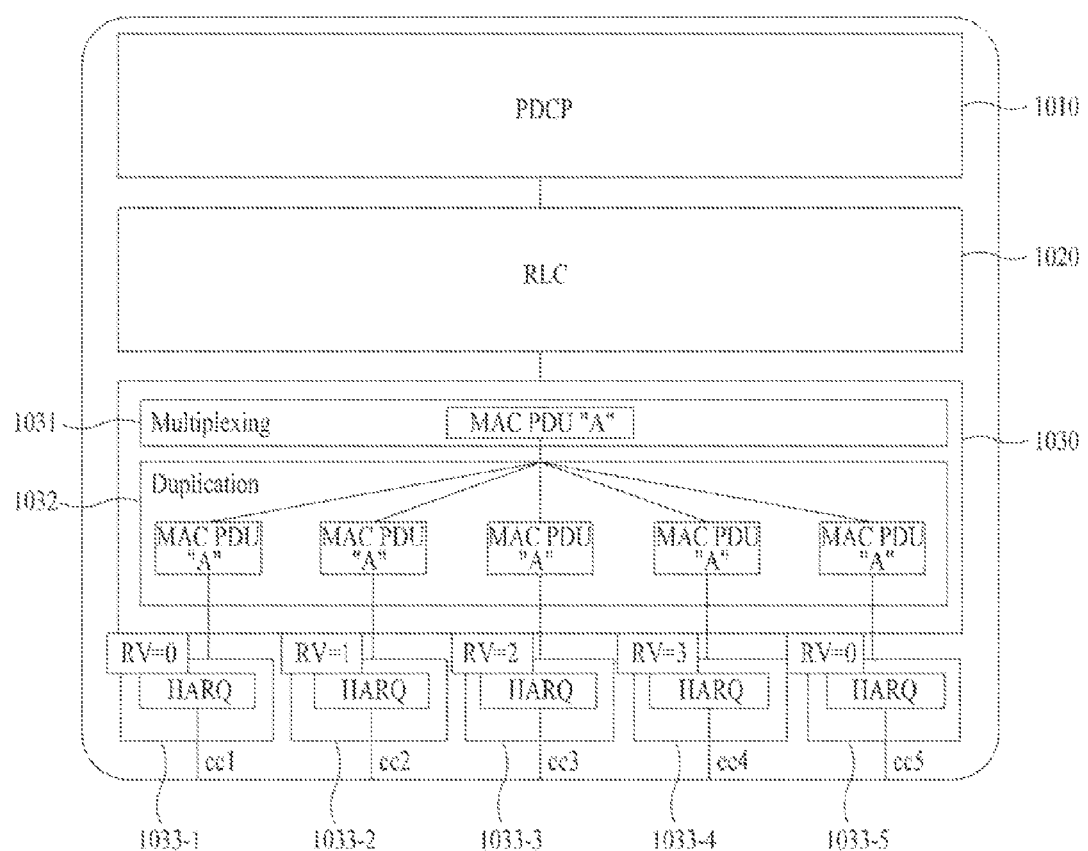
FIG. 10 is a diagram illustrating the architecture of an L2 (second layer) of a transmitter according to another embodiment of the present invention.

FIG. 10 illustrates a UL L2 architecture including a PDCP layer 1010, an RLC layer 1020, and a MAC layer 1030.

In this embodiment, a duplication entity 1032 is defined in the MAC layer 1030 of a transmitter. The duplication entity may generate a plurality of duplicated MAC PDUs from one MAC PDU transmitted by a multiplexing entity 1031 and transmit the duplicately generated MAC PDUs to HARQ entities 1033-1, 1033-2, ..., 1033-N corresponding to N CCs (FIG. 10 shows an example of N=5). The HARQ entities 1033-1, 1033-2, ..., 1033-N may simultaneously transmit the MAC PDUs to a receiver using different RV values.

Specifically, a UE receives a UL grant for duplication transmission from an eNB. The UE may receive the UL grant for duplication transmission through a specific DL CC (or specific cell) designated by the eNB or through all DL CCs (or all cells). When the UL grant for duplication transmission is transmitted through a specific CC (or specific cell), if the UE receives one UL grant for duplication transmission, the duplicately generated MAC PDUs are simultaneously transmitted through all UL CCs (or all cells).

The UL grant may be transmitted through a PDCCH (or HS-SCCH, E-AGCH, or E-RGCH) masked to a C-RNTI of the UE. Alternatively, the eNB may allocate an RNTI (e.g. D-RNTI) which is newly defined to indicate the UL grant for duplication transmission to the UE. If the UL grant is received through the D-RNTI, the UE may perform duplication transmission.

If the UE receives the UL grant demanding duplication transmission, the multiplexing entity 1031 of the MAC layer 1030 of the UE generates a MAC PDU 'A' including RLC PDUs and MAC CEs and transmits the MAC PDU 'A' to the duplication entity.

The duplication entity 1032 receives the MAC PDU 'A' and duplicately generates the MAC PDUs 'A's by the number, N, of UL CCs constituting carrier aggregation. The duplication entity 1032 transmits the duplicately generated MAC PDUs 'A's to the N HARQ entities 1033-1, 1033-2, ..., 1033-N corresponding to the respective CCs.

When transmitting the MAC PDUs 'A's to the HARQ entities 1033-1, 1033-2, ..., 1033-N, the duplication entity 1032 may set RV values for the respective MAC PDUs according to a given rule to transmit the RV values to the HARQ entities 1033-1, 1033-2, ..., 1033-N. Namely, different RV values may be set with respect to the duplicately generated MAC PDUs.

For example, if 4 UL CCs are present, the duplication entity 1032 may set the RV value to 0 and transmit the RV value of 0 to the first HARQ entity 1033-1. The duplication entity 1032 may set the RV value to 1 and transmit the RV value of 1 to the second HARQ entity 1033-2. The duplication entity 1032 may set the RV values to 2 and 3 and transmit the RV values of 2 and 3 to the third HARQ entity 1033-3 and the fourth HARQ entity 1033-4, respectively.

Information about which RV value is set for any HARQ entity may be configured through an RRC message by the eNB. Alternatively, the eNB may inform the UE of the RV value setting method through a PDCCH or MAC CE.

Alternatively, the HARQ entities 1033-1, 1033-2, ..., 1033-N may have fixed RV values used during duplication transmission, without the need for the duplication entity 1032 to set and transmit the RV values to the HARQ entities 1033-1, 1033-2, ..., 1033-N. That is, the eNB may set RV values which are to be used by the HARQ entities during duplication transmission through an RRC message, a MAC message, or a PDCCH, and the HARQ entities of the UE may transmit MAC PDUs using only the RV values when duplication transmission is needed.

As another method, RV values to be used may be calculated through HARQ entity IDs and transmission time points of duplicated MAC PDUs. For example, it is assumed that four HARQ entities are used for four UL CCs and four HARQ entity IDs are called numbers 1, 2, 3, and 4. If a transmission time of the duplicated MAC PDUs is the 101th TTI, a result value of equation (100 modulo HARQ entity ID) is used. If the result value is 1, the HARQ entities of numbers 1, 2, 3, and 4 may set RV values to 1, 2, 3, and 0, respectively, and transmit MAC PDUs.

The HARQ entities simultaneously transmit the MAC PDUs using the RV values defined as described above to the eNB according to the UL grant.

According to the second embodiment, duplication data on a plurality of CCs is used in a similar way to the first embodiment. Therefore, cell coverage can be increased and the probability of data transmission and reception can be increased.

Meanwhile, if HARQ feedback for one MAC PDU among the MAC PDUs duplicately transmitted by the UE is received as an ACK signal, the UE may stop transmitting the MAC PDUs. For example, if three HARQ entities transmit duplicated MAC PDUs and if only one HARQ entity receives a HARQ ACK signal for the MAC PDU, the UE may not perform data retransmission through the HARQ entities receiving HARQ NACK signals even though the other two HARQ entities receive the HARQ NACK signals.

Embodiment 3

The third embodiment of the present invention is described with reference to FIG. 11.

Figure 11:
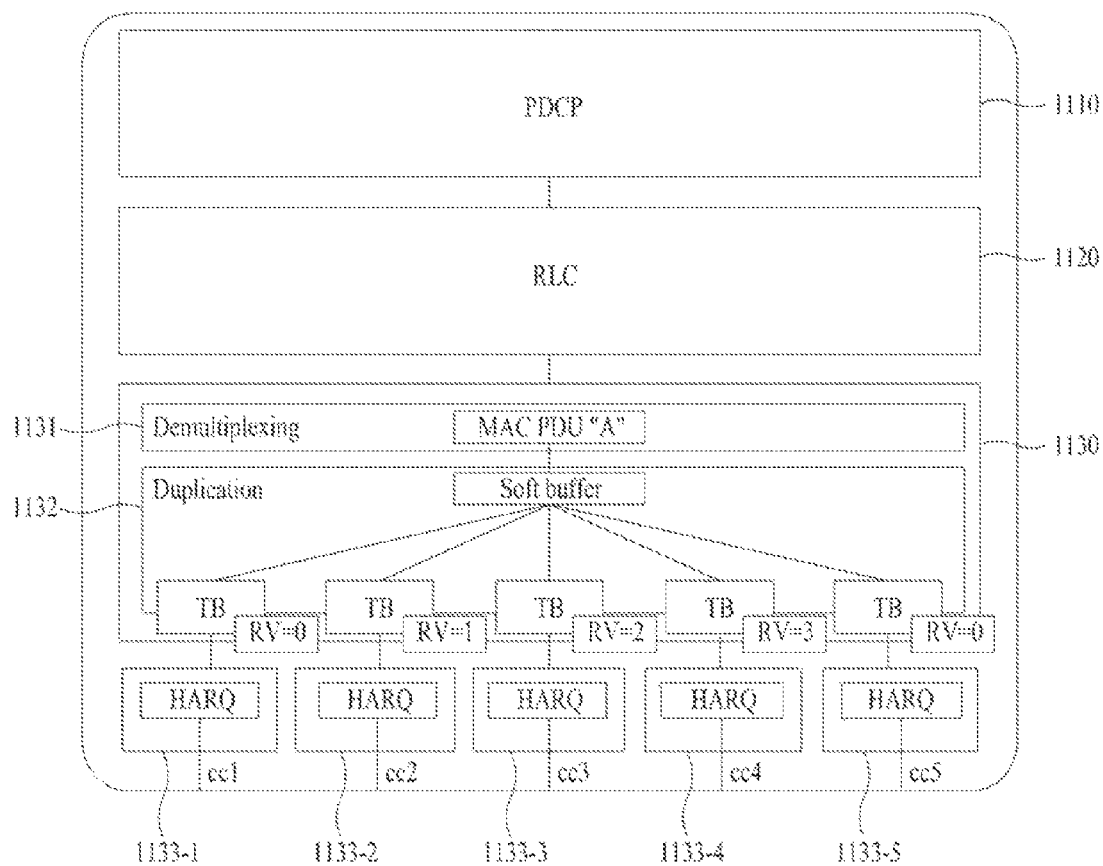
FIG. 11 is a diagram illustrating the architecture of an L2 (second layer) of a receiver according to an embodiment of the present invention.

FIG. 11 illustrates a UL L2 architecture including a PDCP layer 1110, an RLC layer 1120, and a MAC layer 1130. In this embodiment, a duplication entity 1132 is defined in the MAC layer 1130 of a receiver and the receiver receives duplicated data from a transmitter.

Specifically, a UE may receive DL assignment for duplication reception from an eNB. The UE may receive the DL assignment for duplication reception through a specific DL CC designated by the eNB or through all DL CCs. When the DL assignment for duplication reception is transmitted through a specific CC, if the UE receives one DL assignment for duplication reception, the duplicated MAC PDUs are received through all DL CCs.

The DL assignment may be transmitted through a PDCCH masked to a C-RNTI of the UE. Alternatively, the eNB may allocate an RNTI (e.g. D-RNTI) which is newly defined to indicate the DL assignment for duplication transmission to the UE. If the DL assignment is received through the D-RNTI, the UE may perform duplication reception.

If the UE receives DL assignment and duplication reception is demanded, the UE may transmit Transport Blocks (TBs) or MAC PDUs received through N HARQ entities 1133-1, 1133-2, . . . , 1133-N to the duplication entity 1132. (FIG. 11 shows an example of N=5).

The duplication entity 1132 attempts to combine TBs received from the HARQ entities 1133-1, 1133-2, . . . , 1133-N using a soft buffer. Thus, even though transmission power of the transmitter is low, the probability of successful data reception can be increased by combining the same data generated duplicately at the receiver. Furthermore, cell coverage can be increased compared with the case in which duplication data on a plurality of CCs is not used.

RV values of the TBs received from the HARQ entities 1133-1, 1133-2, . . . , 1133-N can be derived from the UE according to the various RV value setting methods described in UL HARQ of the second embodiment.

If the duplication entity 1132 successfully performs decoding by combining TBs received from the HARQ entities 1133-1, 1133-2, . . . , 1133-N, the UE transmits the TBs to a demultiplexing entity 131. The duplication entity 1132 requests the HARQ entities 1133-1, 1133-2, . . . , 1133-N to transmit a HARQ ACK signal to the eNB as HARQ feedback. On the other hand, if decoding fails, the duplication entity 1132 requests the HARQ entities 1133-1, 1133-2, . . . , 1133-N to transmit a HARQ NACK signal.

As one method for transmitting HARQ feedback to the eNB, all the HARQ entities 1133-1, 1133-2, . . . , 1133-N may transmit HARQ feedback to the eNB. As another method, the eNB configures a specific HARQ entity and only the configured HARQ entity may transmit HARQ feedback to the eNB when transmission of HARQ feedback is demanded.

Embodiment 4

The fourth embodiment of the present invention is described with reference to FIG. 12.

Figure 12:
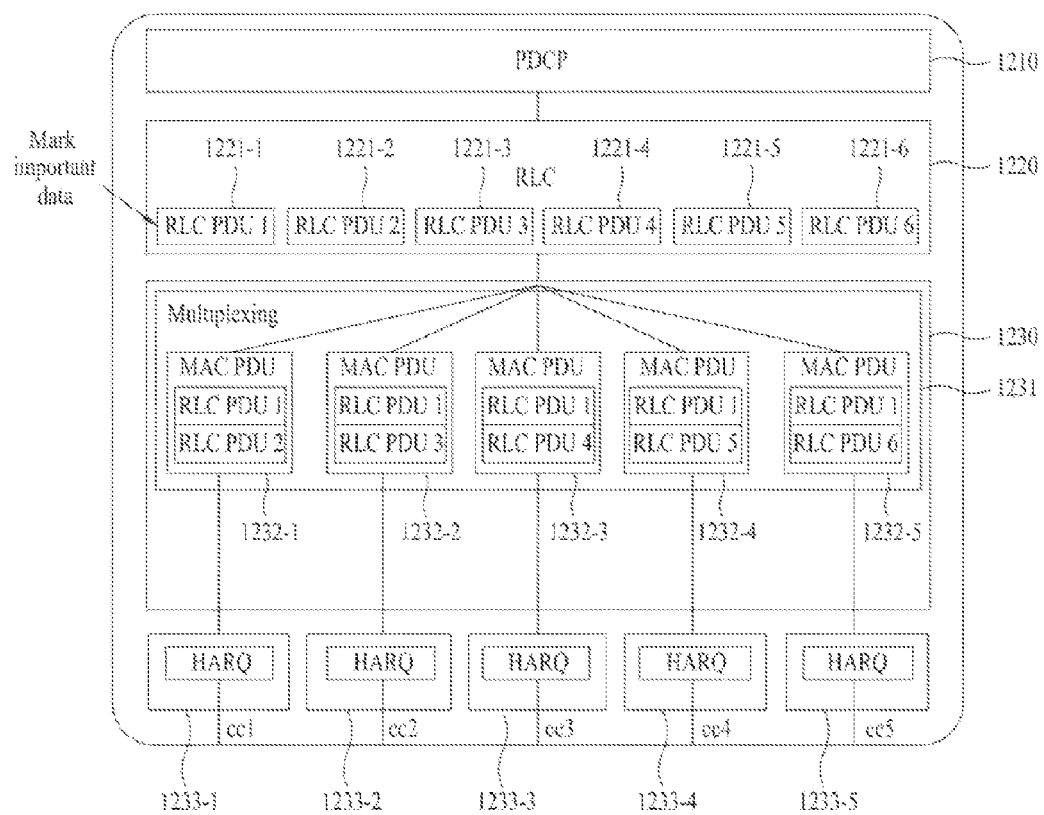
FIG. 12 is a diagram illustrating the architecture of an L2 (second layer) of a transmitter according to another embodiment of the present invention.

FIG. 12 illustrates a UL L2 architecture including a PDCP layer 1210, an RLC layer 1220, and a MAC layer 1230. According to this embodiment, in a transmitter, the RLC layer 1220 marks important RLC PDUs to be transmitted to the MAC layer 1230 and the MAC layer 1230 generates MAC PDUs by duplicately using the marked RLC PDUs. The MAC layer 1230 transmits the MAC PDUs to a receiver using CCs.

Specifically, if a UE receives a UL grant, a multiplexing entity 1231 of the MAC layer 1230 of the UE requests that the RLC layer 1220 transmit RLC PDUs. Then the RLC layer 1220 transmits RLC PDUs 1221-1, 1221-2, . . . , 1221-K to the multiplexing entity 1231 of the MAC layer 1230 by marking important data for request of duplication transmission (FIG. 6 shows an example of K=6).

The important data may be, for example, an RLC PDU of Signaling RB (SRB), an RLC PDU including an initialization and Refresh (IR) packet of Robust Header Compression (ROHC), an RLC PDU including a PDCH control PDU, an RLC control PDU, and RLC retransmitted PDU. The RLC layer 1220 may mark the important data according to indication of an upper layer (PDCP layer) and transmits the marked important data to the MAC layer 1230.

When configuring MAC PDUs for UL CCs, the multiplexing entity 1231 of the MAC layer 1230 of the UE includes all RLC PDUs marked for duplication transmission in MAC PDUs to be configured for respective UL CCs.

For example, assuming that 5 UL CCs are configured and UL grants permitting the UE to use resources of 100 for UL CCs are received, the MAC layer 1230 requests according to the UL grants that the RLC layer 1220 transmit RLC PDUs and the RLC layer 1220 transmits an RLC PDU1(50), RLC PDU2(50), RLC PDU3(50), RLC PDU4(50), RLC PDU5(50), and RLC PDU6(50) to the MAC layer 1230. It is assumed that RLC PDU1 is marked for duplication transmission as important data. The multiplexing entity 1231 generates and transmits MAC PDUs 1232-1, . . . , 1232-N to HARQ entities 1233-1, . . . , 1233-N (FIG. 12 shows an example of N=5) according to the RLC PDUs and the marking information.

Specifically, the multiplexing entity 1231 generates the MAC PDU 1232-1 including RLC PDU1 and RLC PDU2 and transmits the MAC PDU 1232-1 to the first HARQ entity 1233-1. The multiplexing entity 1231 generates the MAC PDU 1232-2 including RLC PDU1 and the RLC PDU3 and transmits the MAC PDU 1232-2 to the second HARQ entity 1233-2. The multiplexing entity 1231 generates the MAC PDU 1232-3 including RLC PDU1 and RLC PDU4 and transmits the MAC PDU 1232-4 to the third HARQ entity 1233-3. The multiplexing entity 1231 generates the MAC PDU 1232-4 including RLC PDU1 and RLC PDU5 and transmits the MAC PDU 1232-4 to the fourth HARQ entity 1233-4. The multiplexing entity 1231 generates the MAC PDU 1232-5 including RLC PDU1 and RLC PDU6 and transmits the MAC PDU 1232-5 to the fifth HARQ entity 1233-5.

The respective HARQ entities 1233-1, . . . , 1233-N transmit the MAC PDUs received from the multiplexing entity to the eNB. Though such a configuration, the marked important data (RLC PDU1) in the RLC layer 1220 can be duplicately transmitted through a plurality of MAC PDUs. Accordingly, even if data on any one CC is lost, since the important data (RLC PDU1) is duplicately present on the other CCs, the probability of successful data transmission and reception is increased and problems (call drop etc.) caused by loss of important data can be prevented.

The above described first to fourth embodiments may be applied to a carrier aggregation system which performs communication using a plurality of CCs. The carrier aggregation system may be an LTE-A system, or a UMTS system supporting dual cell-HSDPA/dual cell-HSUPA.

Although the first, second, and fourth embodiments for the duplication data transmission method have been described for the case in which the UE is a transmitter and the eNB is a receiver, the present invention is not limited thereto and includes the case in which the eNB is a transmitter and the UE is a receiver. Moreover, although the third embodiment for the duplication data reception method has described the case in which the eNB is a transmitter and the UE is a receiver, the present invention is not limited thereto and includes the case in which the UE is a transmitter and the eNB is a receiver.

In the aforementioned embodiments, a plurality of CCs indicates both UL CCs and DL CCs. Furthermore, in the aforementioned embodiments, a cell has the same meaning as a CC in a carrier aggregation system.

In the above embodiments, duplicately generated data may be an RLC PDU or a MAC PDU.

Hereinafter, a method in which an eNB configures transmission and reception of duplication data of a UE in relation to various embodiments of the present invention will be described.

As a first method, the eNB may cause the UE to transmit and receive duplication data through an RRC message. Alternatively, the eNB may transmit System Information (SI) including information related to transmission and reception of duplication data to all UEs within a cell so that all the UEs within the cell may perform a transmission and reception process of duplication data.

As a second method, the eNB may command the UE to perform transmission and reception operation of duplication data through a PDCCH, an HS-SCCH, or a MAC CE. For example, the eNB may transmit a specific code point of a PDCCH or an HS-SCCH or a masked specific RNTI to the UE to activate or deactivate transmission and reception of duplication data. As another method, the eNB may command the UE to activate or deactivate transmission and reception of duplication data using a newly defined MAC CE.

As a third method, the eNB may cause the UE to transmit and receive duplication data only with respect to important data. For example, the eNB may configure duplication transmission of the UE when the UE transmits RLC PDUs of an SRB, an IR packet of an ROHC, a PDCP/RLC control PDU, an RLC retransmitted PDU, etc.

An embodiment of a wireless communication system including a UE device and an eNB device according to the present invention will be described hereinbelow.

The above-described FIG. 6 illustrates the architecture of a transmitter of a UL L2 (second layer) in carrier aggregation. A UE device according to an embodiment of the present invention supports a carrier aggregation technique which performs communication using a plurality of CCs and a processor of the UE device may include layer modules corresponding to the respective layers shown in FIG. 6.

The UE device for transmitting duplication data may include an RLC layer module, a MAC layer module, and a Physical layer module.

The RLC layer module segments and concatenates data received from an upper layer to appropriately adjust data size such that a lower layer can send data to a radio section. Also, the RLC layer may generate an RLC PDU to be transmitted and transmit the RLC PDU to the MAC layer.

The MAC layer module may map various logical channels to various transport channels, and also perform logical channel multiplexing for mapping several logical channels to one transport channel. The MAC layer module may include a multiplexing entity for generating a MAC PDU by multiplexing the RLC PDU transmitted by the RLC layer module, a duplication entity for receiving the MAC PDU from the multiplexing entity and duplicately generating the same MAC PDU, and a plurality of HARQ entities corresponding to a plurality of CCs.

The physical layer module may provide information transfer services to upper layers using a physical channel and transmit and receive data to and from the MAC layer through a transport channel. The physical layer module of the UE device may control transmission and reception of a control signal and data through a physical channel (control channel and/or data channel) using radio resources between the physical layer of the UE device and a physical layer of a network (eNB) side. Specifically, the physical layer module may map transport channels received from the plurality of HARQ entities of the MAC layer to UL physical channels and transmit the mapped physical channels to a network. The physical layer module may receive a DL control channel (PDCCH) and/or a DL data channel (PDSCH) from the network.

The MAC layer module of the UE device performing duplication data transmission according to the embodiment of the present invention may generate a plurality of duplication data using RLC PDUs through a multiplexing entity and a duplication entity, upon receiving control information about duplication data transmission from the eNB, and transmit each of the plurality of duplication data to the physical layer module through each of the plurality of HARQ entities. The physical layer module may map transport channels received from the plurality of HARQ entities to UL physical channels and simultaneously transmit the mapped physical channels to the eNB.

Meanwhile, in a UE device performing duplication data reception according to another embodiment of the present invention, a MAC layer module may include a plurality of HARQ entities corresponding to a plurality of CCs, a duplication entity for combining and decoding MAC PDUs transmitted by the plurality of HARQ entities, and a demultiplexing entity for demultiplexing the MAC PDUs transmitted by the duplication entity. A physical layer module may transmit DL physical channels received over a plurality of CCs to the plurality of HARQ entities through transport channels.

In the UE device receiving duplication data, the MAC layer module may transmit a plurality of duplication data on a plurality of CCs to the duplication entity through the plurality of HARQ entities, perform decoding by combining the plurality of duplication data through the duplication entity, and transmit HARQ feedback based on the decoded result to the eNB through one or more of the plurality of HARQ entities.

Figure 13:
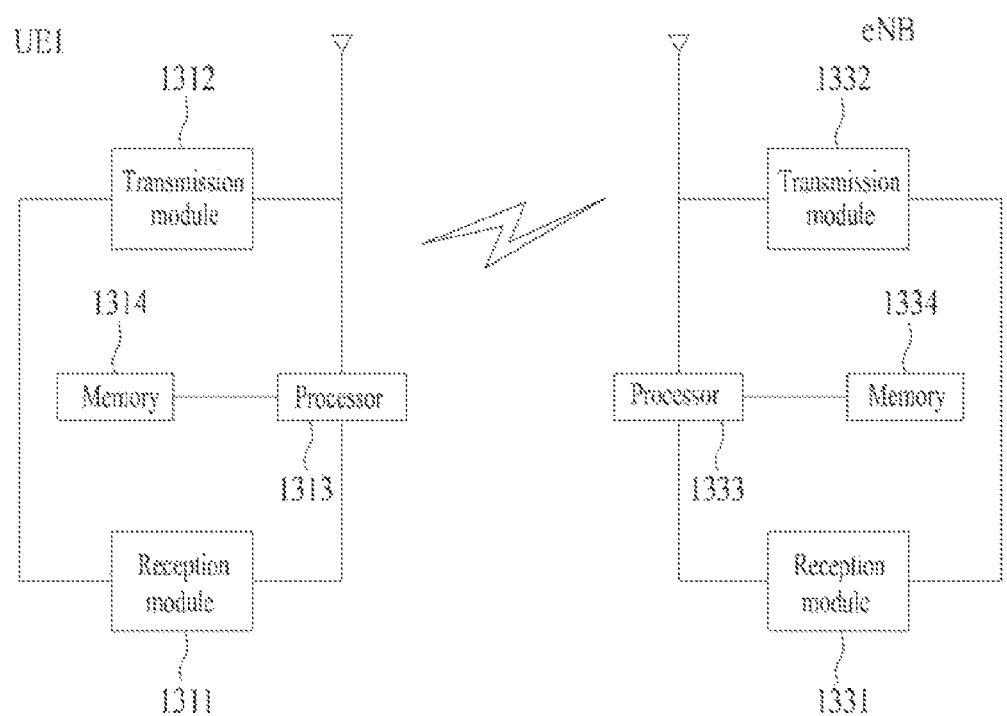
FIG. 13 is a diagram illustrating the configuration of an exemplary embodiment of a wireless communication system including a UE device and an eNB device according to the present invention.

FIG. 13 is a diagram illustrating the configuration of an embodiment of a wireless communication system including a UE device and an eNB device according to the present invention.

Referring to FIG. 13, the UE device may include a reception module 1311, a transmission module 1312, a processor 1313, and a memory 1314. The reception module 1311 may receive various signals, data, information, etc. from an eNB etc. The transmission module 1312 may transmit various signals, data, information, etc. to the eNB etc.

In the UE device transmitting duplication data, the processor 1313 may control the MAC layer to generate a plurality of duplication data using RLC PDUs from the RLC layer and to simultaneously transmit the plurality of duplication data to the eNB on a plurality of CCs through the plurality of HARQ entities.

Meanwhile, in the UE device receiving duplication data, the processor 1313 may control the MAC layer module to receive a plurality of duplication data on a plurality of CCs from the eNB through the plurality of HARQ entities, perform decoding by combining the plurality of duplication data, and transmit HARQ feedback based on the decoded result to the eNB through one or more of the plurality of HARQ entities.

The processor 1313 may also operationally process information received by the UE device, information to be transmitted to the exterior, and the like. The memory 1314 may store the operationally processed information for a predetermined time and may be replaced with an element such as a buffer (not shown).

Meanwhile, the eNB device may include a reception module 1331, a transmission module 1332, a processor 1333, and a memory 1334. The reception module 1331 may receive various signals, data, information, etc. from a UE etc. The transmission module 1332 may transmit various signals, data, information, etc. to the UE etc.

The eNB device may provide control information about transmission and reception of duplication data to the UE through an RRC message, SI, PDCCH, HS-SCCH, MAC CE, etc.

In the eNB device transmitting duplication data, the processor 1333 may control the MAC layer to generate a plurality of duplication data using RLC PDUs from the RLC layer and to simultaneously transmit the plurality of duplication data to the UE on a plurality of CCs through the plurality of HARQ entities.

Meanwhile, in the eNB device receiving duplication data, the processor 1333 may control the MAC layer module to receive a plurality of duplication data on a plurality of CCs from the UE through the plurality of HARQ entities, perform decoding by combining the plurality of duplication data, and transmit HARQ feedback based on the decoded result to the UE through one or more of the plurality of HARQ entities.

The processor 1333 may also operationally process information received by the UE device, information to be transmitted to the exterior, and the like. The memory 1334 may store the operationally processed information for a predetermined time and may be replaced with an element such as a buffer (not shown).

The above-described embodiments of the present invention can be implemented by various means, for example, hardware, firmware, software, or combinations thereof.

In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

The detailed description of the exemplary embodiments of the present invention has been given to activate those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. The invention should not be limited to the specific embodiments described herein, but should be accorded the broadest scope consistent with the principles and novel features disclosed herein. Also, claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method for transmitting duplication data in a transmitter which supports carrier aggregation performing communication using N (where N≥2) component carriers, the method comprising:
generating, at a Media Access Control (MAC) layer of the transmitter, N duplication data using Radio Link Control (RLC) Protocol Data Units (PDUs) from an RLC layer; and
simultaneously transmitting on the N component carriers each of the N duplication data to a receiver through each of N Hybrid Automatic Repeat and reQuest (HARQ) entities,
wherein the N duplication data are N MAC PDUs generated by multiplexing RLC PDUs, and
the RLC PDUs include a RLC PDU which is marked as data to be duplicately transmitted, and each of the N MAC PDUs include at least the marked RLC PDUs while multiplexing the RLC PDUs.

2. The method of claim wherein each of the N HARQ entities uses independent or different Redundancy Version (RV) values with respect to the N duplication data.

3. The method of claim 1, wherein the generation of the N duplication data includes:
generating one MAC PDU by multiplexing the RLC PDUs; and
duplicately generating MAC PDUs which are the same as the one MAC PDU to generate the N duplication data.

4. The method of claim 1, further including, if an Acknowledgement (ACK) signal is received, as HARQ feedback with respect to one of the N duplication data, configuring that the other duplication data is not retransmitted.

5. The method of claim 1, wherein the transmitter is a user equipment and the receiver is a base station, and further including receiving control information about duplication data transmission from the base station through one or more of the N component carriers.

6. The method of claim 5, wherein the control information includes uplink grant for duplication data transmission and the uplink grant is masked with a user equipment identifier or with an identifier for duplication data transmission.

7. A method for receiving duplication data in a receiver which supports carrier aggregation performing communication using N (where N≥2) component carriers, the method comprising:
receiving N duplication data on the N carrier components from a transmitter through each of N Hybrid Automatic Repeat and reQuest (HARQ) entities:
combining the N duplication data and decoding the combined N duplication data; and
transmitting HARQ feedback based on the decoded result through one or more of the N HAW entities,
wherein the N duplication data are N MAC PDUs generated by multiplexing RLC PDUs, and
the RLC PDUs include a RLC PDU which is marked as data to be duplicately transmitted, and each of the N MAC PDUs include at least the marked RLC PDUs while multiplexing the RLC PDUs.

8. The method of claim 7, wherein the transmitter is a base station and the receiver is a user equipment, and further including receiving control information about duplication data reception from the base station through one or more of the N component carriers.

9. The method of claim 8, wherein the control information includes downlink assignment for duplication data reception and the downlink assignment is masked with a user equipment identifier or with an identifier for duplication data transmission.

10. A user equipment device which supports carrier aggregation performing communication using N (where N≥2) component carriers and transmits duplication data, the user equipment device comprising:

a memory; and processor configured to control a Radio Link Control RLC layer module a Media Access Control (MAC) layer module including a multiplexing entity, a duplication entity, and N Hybrid Automatic Repeat and reQuest (HARQ) entities, and a physical layer module, wherein, using the RLC layer module, transmission data is generated as RLC Protocol Data Units (PDUs) and the RLC PDUs are transmitted to the MAC layer module, a MAC PDU is generated using the multiplexing entity by multiplexing the RLC PDUs transmitted from the RLC layer module, N same MAC PDUs are duplicately generated from the MAC PDU using the duplication entity, wherein the N HARQ entities correspond to the N component carriers, and transport channels received from the N HARQ entities are mapped to uplink physical Channels using the physical layer module, and the mapped channels are transmitted to a base station, and downlink control channels are received from the base station, wherein, if control information about duplication data transmission is received from the base station, N duplication data are generated using the RLC PDUs through the multiplexing entity and the duplication entity, and the N duplication data are transferred to the physical layer module through the N HARQ entities, and wherein, using the physical layer module, each of the N duplication data are simultaneously transmitted to the base station, wherein the N duplication data are N MAC PDUs generated by multiplexing RLC PDUs, and the RLC PDUs include a RLC PDU which is marked as data to be duplicately transmitted, and each of the N MAC PDUs include at least the marked RLC PDUs while multiplexing the RLC PDUs.

11. A user equipment device which supports carrier aggregation performing communication using N (where N≥2) component carriers and receives duplication data, the user equipment device comprising:

a memory; and a processor configured to control a Media Access Control (MAC) layer module including N Hybrid Automatic Repeat and reQuest (HARQ) entities corresponding to the N component carriers, a duplication entity, and a demultiplexing entity, and a physical layer module, wherein MAC Protocol Data Units (PDUs) transferred from the N HARQ entities are combined and decoded using the duplication entity, the MAC PDUs transferred from the duplication entity are demultiplexed using the demultiplexing entity, wherein, using the physical layer module, downlink physical channels received on the N component carriers are transmitted to the N HARQ entities through transport channels, and downlink control channels are received from a base station, wherein, if control information about duplication data reception is received from the base station, N duplication data on the N component carriers are transferred to the duplication entity through the N HARQ entities, the N duplication data are combined and decoded through the duplication entity, and HARQ feedback based on the decoded result is transmitted to the base station through one or more of the N HARQ entities, wherein the N duplication data are N MAC PDUs generated h multiplexing RLC PDUs, and the RLC PDUs include a RLC PDU which is marked as data to be duplicately transmitted, and each of the N MAC PDUs include at least the marked RLC PDUs while multiplexing the RLC PDUs.

\* \* \* \* \*